(12) United States Patent
Borg et al.

(10) Patent No.: US 6,554,559 B1
(45) Date of Patent: Apr. 29, 2003

(54) DEVICE FOR SUPPLYING TO A MACHINE-TOOL BARS TO BE MACHINED

(75) Inventors: Per Borg, Rolle (CH); Francisco Rivera, Nyon (CH)

(73) Assignee: Codafi SARL, Rolle (CH)

( * ) Notice: Subject to any disclaimer, the term of this patent is extended or adjusted under 35 U.S.C. 154(b) by 0 days.

(21) Appl. No.: 09/719,288

(22) PCT Filed: Jun. 9, 1998

(86) PCT No.: PCT/CH98/00248

§ 371 (c)(1),
(2), (4) Date: Dec. 8, 2000

(87) PCT Pub. No.: WO99/64204

PCT Pub. Date: Dec. 16, 1999

(51) Int. Cl.[7] .................................................. B23Q 5/22
(52) U.S. Cl. ......................... 414/746.1; 414/15; 414/16; 414/745.7; 198/468.2; 82/126; 82/151
(58) Field of Search ............................... 414/15, 16, 17, 414/745.7, 745.9, 746.1, 746.8; 82/151, 124, 125, 126, 127; 198/468.2, 468.8

(56) References Cited

U.S. PATENT DOCUMENTS 3,630,069 A * 12/1971 White .......................... 72/420
4,417,491 A * 11/1983 Uehara et al. ................. 82/2.7
4,548,537 A * 10/1985 Kubotera et al. ............ 414/276
4,662,506 A * 5/1987 Tueckmantel et al. ... 198/463.5
5,881,617 A * 3/1999 Cucchi ......................... 82/127

FOREIGN PATENT DOCUMENTS

| DE | 32 33 658 A | 3/1984 | |
|---|---|---|---|
| DE | 3900201 A1 * | 7/1990 | ........... B65G/47/14 |
| EP | 0 348 763 A | 1/1990 | |

* cited by examiner

*Primary Examiner*—Eileen D Lillis
*Assistant Examiner*—Michael Lowe
(74) *Attorney, Agent, or Firm*—Clifford W. Browning; Woodard, Emhardt, Naughton, Moriarty & McNett LLP

(57) ABSTRACT

The invention concerns a device wherein the bars (13) are arranged in bulk in the container (5). The mobile frame (17) of the grasping mechanism (14) moves forward such that the jaw (24) can seize a bar by its middle part and remove it in position (13a) while the trolleys (37) move away from the rail (36) so that the rollers slide on the rods (43), gradually lift the whole bar and bring it to rest on the receptacle (16). The shaft (49) is then driven in rotation so that the racks (47) and the support plate segments (46), which form the receptacle (16), move upwards and the bar (13) drops in the supply channel (8) where it is hooked to the bar clamp of the bar-pusher which drives it axially into the turning center control members.

18 Claims, 7 Drawing Sheets

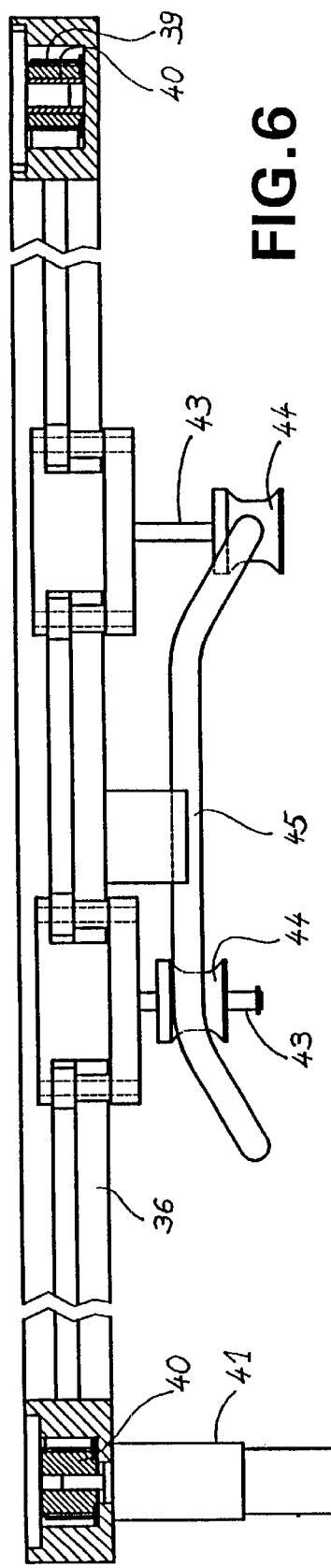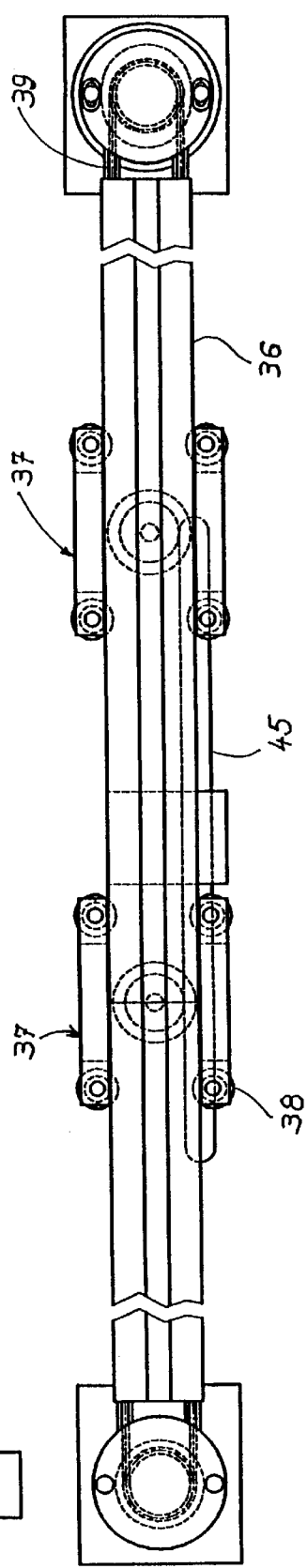

DEVICE FOR SUPPLYING TO A MACHINE-TOOL BARS TO BE MACHINED

The object of the present invention is a device for supplying a machine tool, in particular an automatic lathe, with bars to be machined, comprising a feed channel aligned on the axis of the machine tool and means for introducing bars into this channel one by one.

In the field of the feeding of machine tools and in particular automatic lathes working on raw material in bar form, many types of feed are already known making it possible to extend the autonomous operating period of the machine. However, for lathes or other machining centres working on small-diameter bars, in particular on bars whose diameter is less than 1 cm, the known feeds are not satisfactory.

The purpose of the present invention is therefore to create a feed for storing a large number of bars and functioning in an entirely reliable manner, even where the bars are of small diameter.

To this end the device according to the invention relates to a device for supplying a machine tool, in particular an automatic lathe, with bars to be machined, comprising a feed channel aligned on the axis of the machine tool and means for introducing bars into this channel one by one, the said means comprising a fixed container able to contain a stock of bars stacked in bulk in the longitudinal direction, having a straight top longitudinal edge, a receptacle adjacent to the said top edge of the container and extending above the feed channel, at least one repetitive-action gripping mechanism, disposed so as to grip, in the container, at least a portion of a bar and to pull it into a given position situated above the receptacle, at least one alignment mechanism having at least one member which moves in the longitudinal direction and progressively withdraws from the container all the bar gripped by the gripping mechanism, so as to place all the bar in the receptacle, and control means which cause the bar to be released and to drop into the bottom of the receptacle and then into the feed channel.

Other characteristics of the device according to the invention are defined in the claims subordinate to claim 1.

Figure 1:
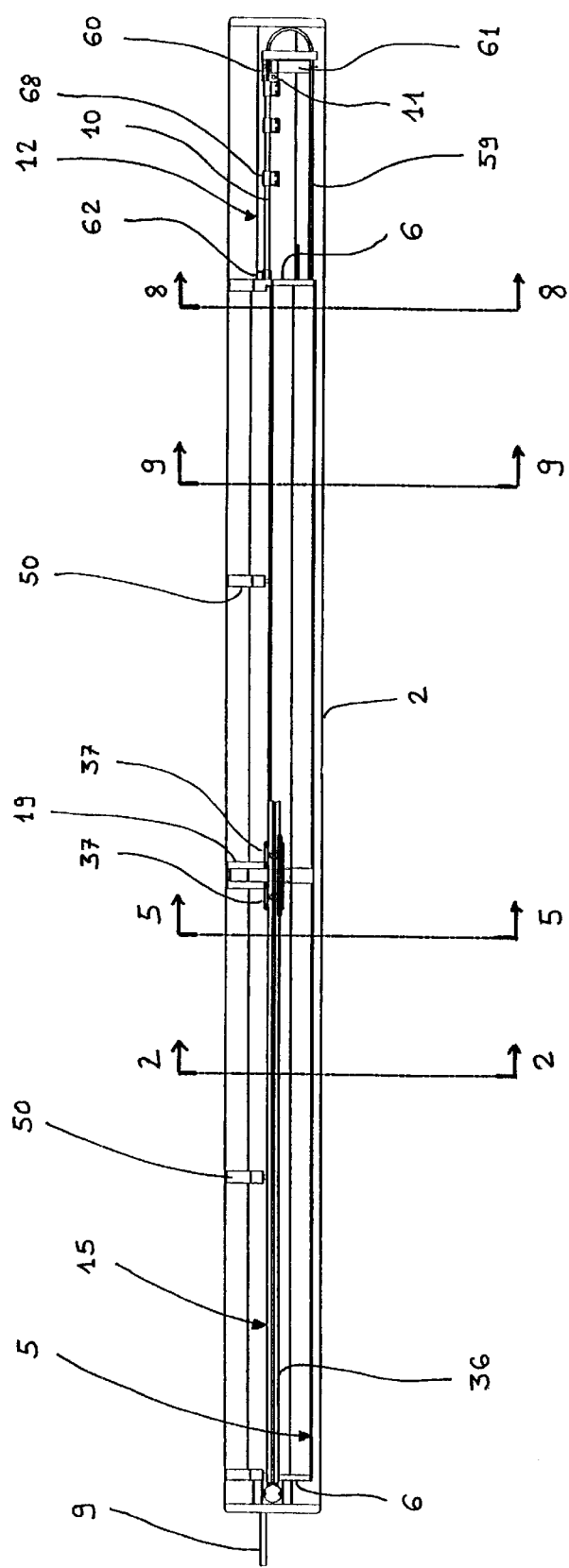
Figure 2:
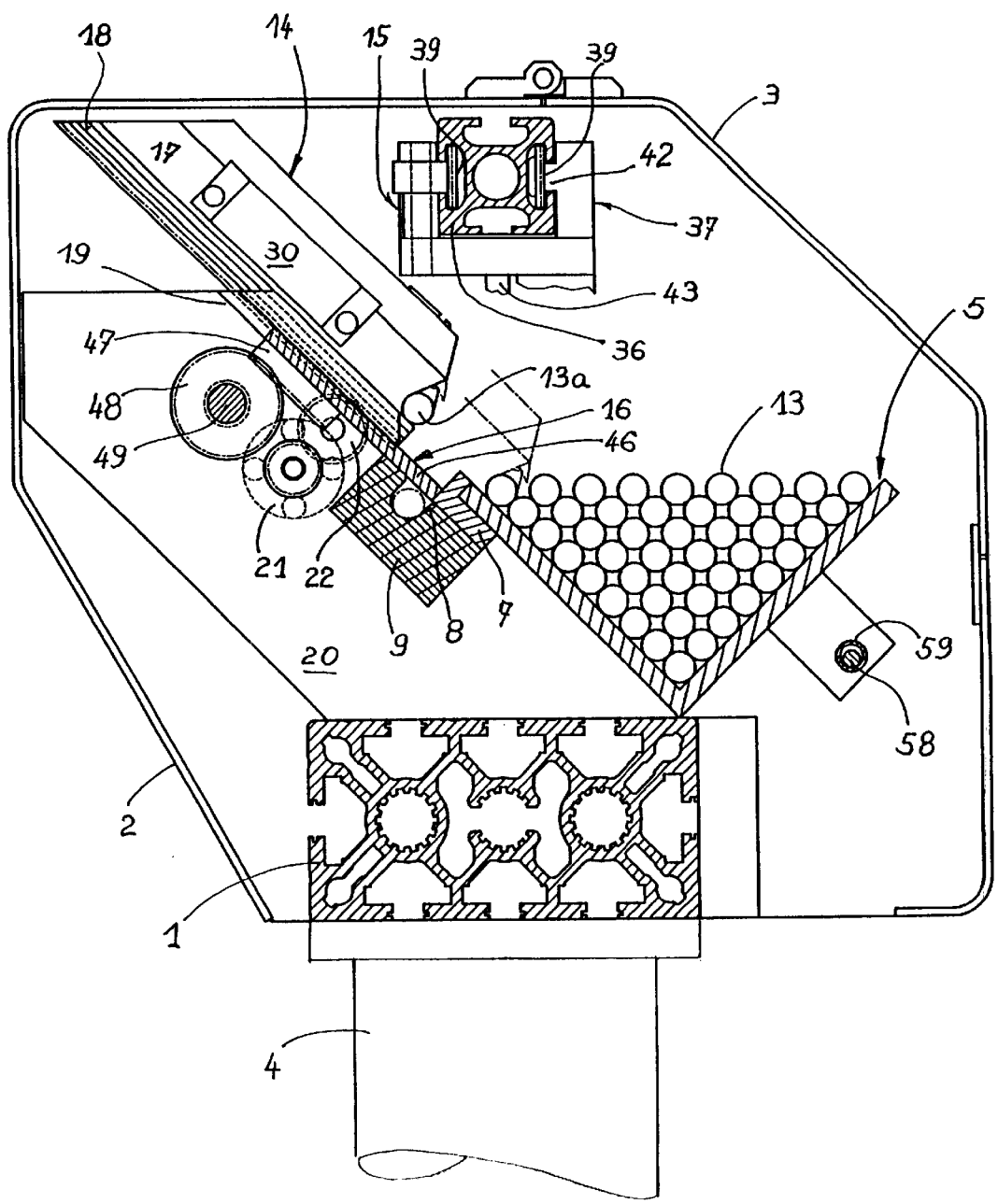
Figure 3:
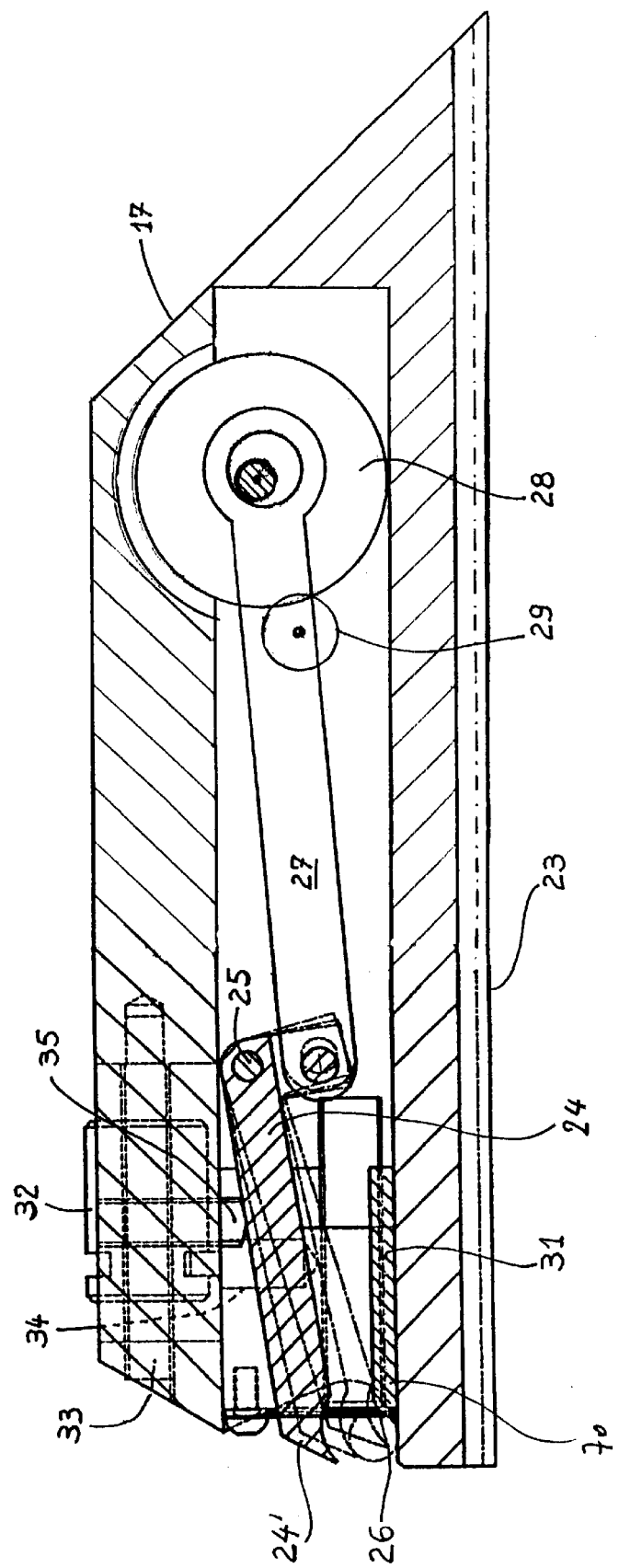
Figure 5:
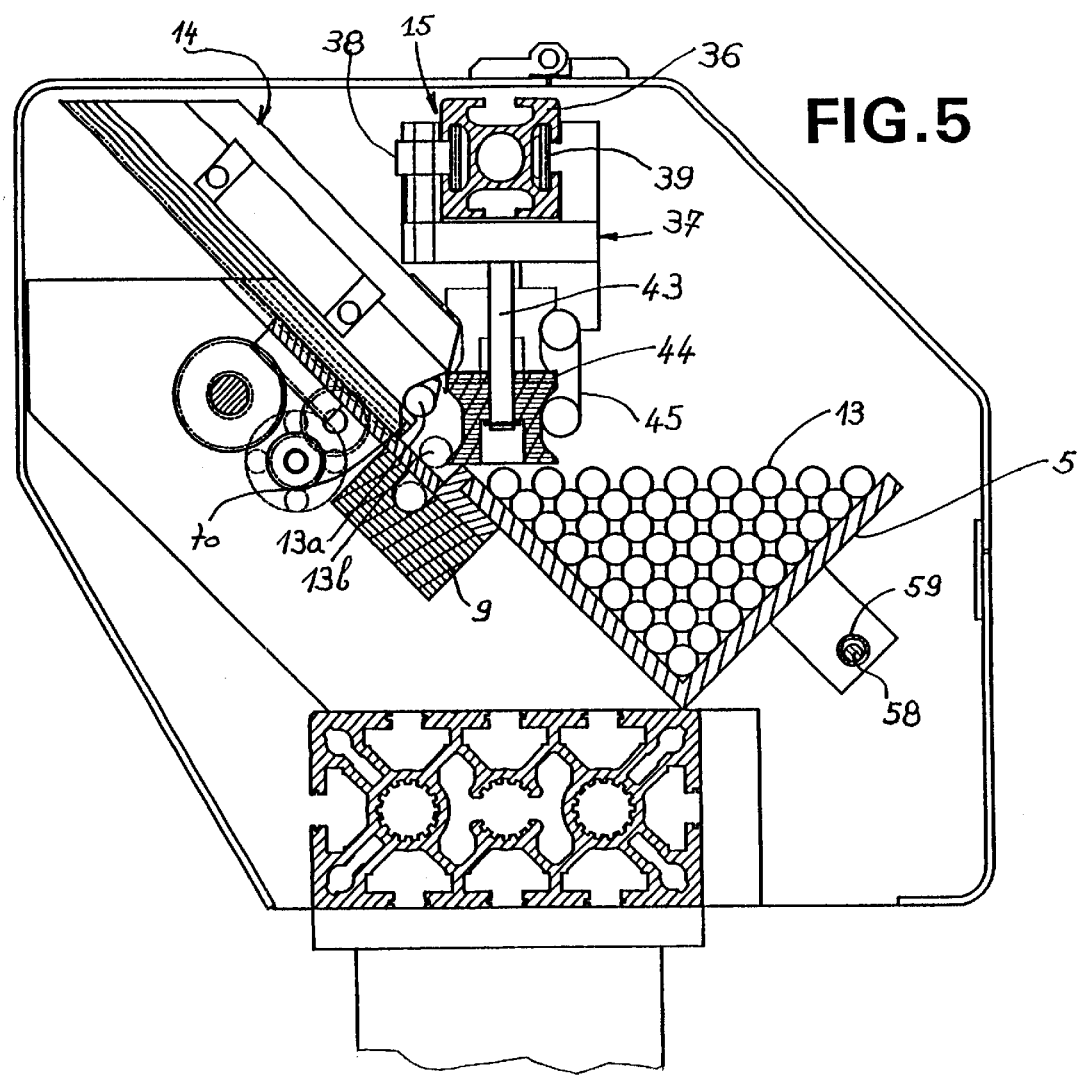
Figure 4:
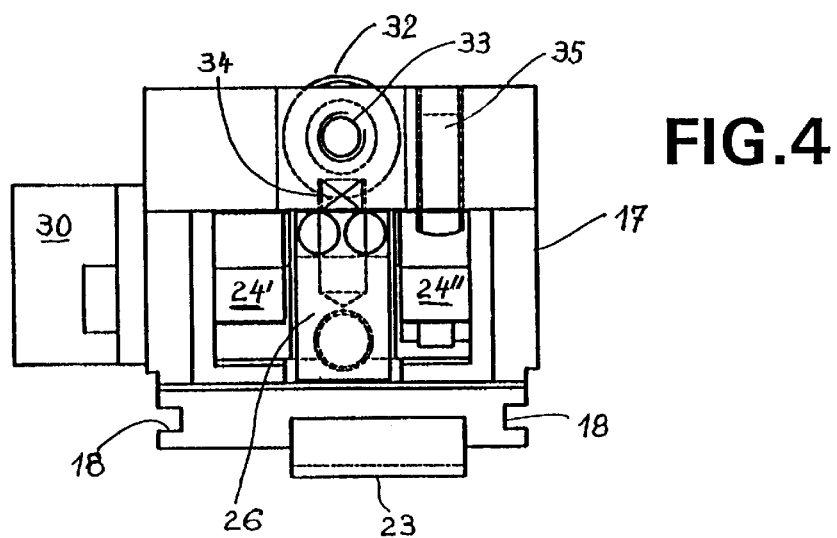
Figure 8:
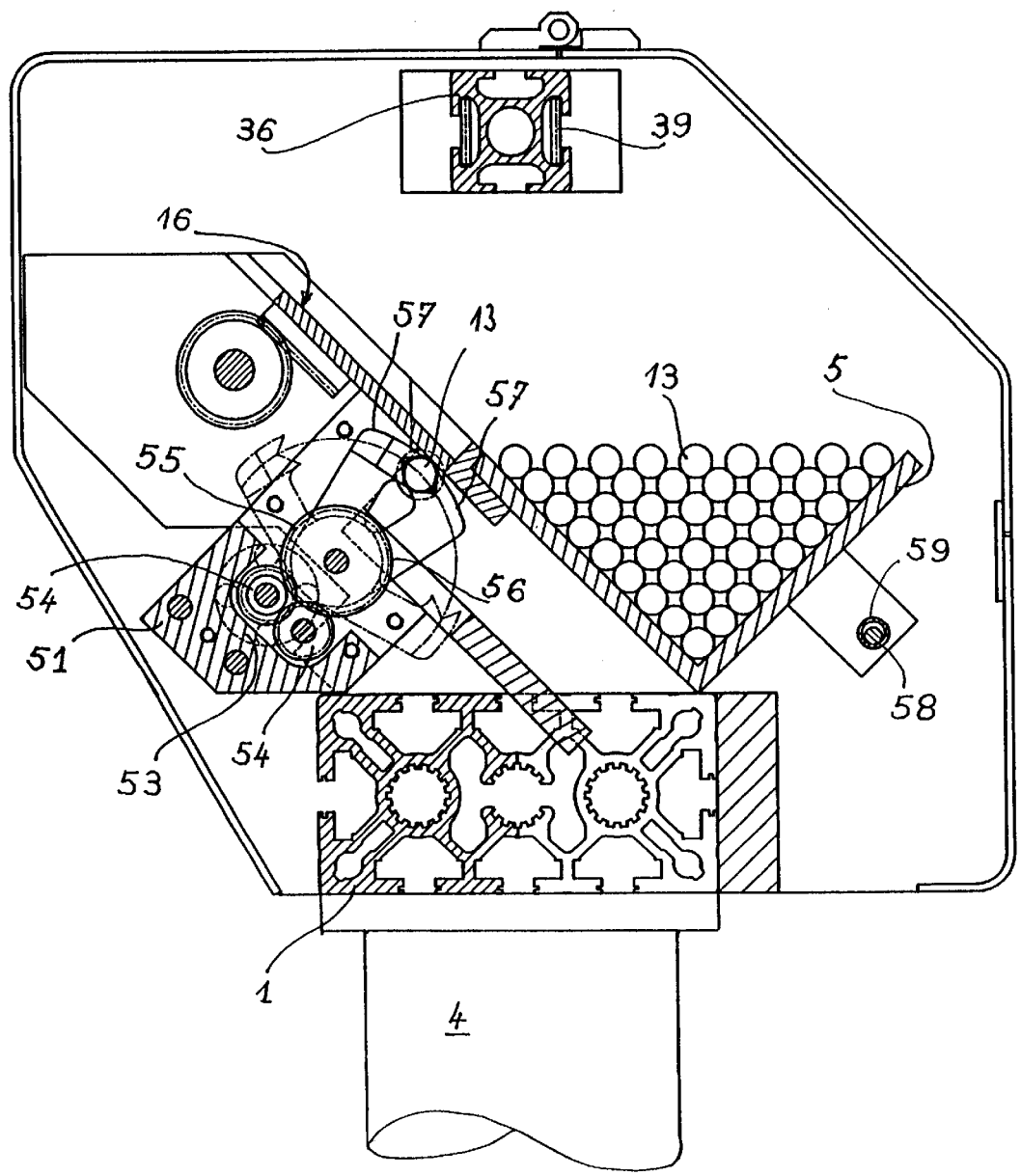
Figure 9:
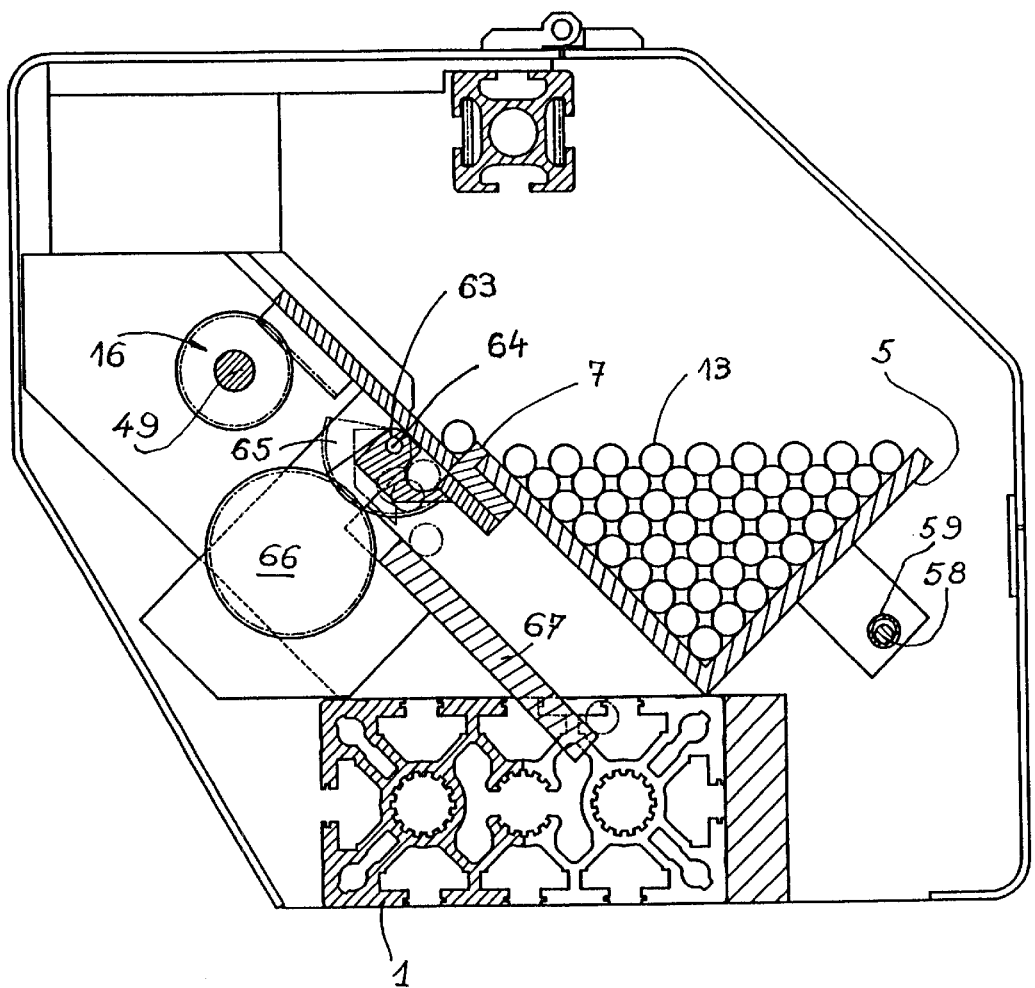

One embodiment of the object of the invention is described below, by way of example, referring to the accompanying drawing, in which:

FIG. 1 is a general plan view of the whole of the device, the cover on the gripping mechanism being removed, FIG. 2 is a view in section along the line 2—2 in FIG. 1 showing the frame of the gripping mechanism, FIG. 3 is a view in elevation, partially cut away, showing the frame of the gripping mechanism seen in profile, FIG. 4 is a front elevation view of the frame of the gripping mechanism, FIGS. 5, 6 and 7 are views in section along the line 5—5 in FIG. 1, in longitudinal elevation and in plan showing the alignment mechanism, FIG. 8 is a view in section along the line 8—8 in FIG. 1 showing the auxiliary clamp, and FIG. 9 is a view in section along the line 9—9 in FIG. 1 showing the mechanism for ejecting the bar ends.

As is known, the main difficulty encountered with small-diameter bars stems from their great flexibility resulting from the high ratio between length and diameter. In fact it is essential to be able to feed the lathe, or other machine tool, with bars whose length is of the same order as for average and large diameters, that is to say around 3 to 4 m. The great flexibility which results therefrom is the cause of problems not only for transferring bars from the container into the feed channel but also for their correct engagement in the machine tool control members.

The device described below resolves these problems.

Its general arrangement is visible in FIGS. 1 and 2. The main elements of the structure are a framework profiled member 1 (FIG. 2) which supports a general fairing 2 with an opening cover 3 which is itself carried by uprights 4. Inside the fairing 2 there is mounted a container 5 in the shape of a V disposed horizontally and delimited by two end plates 6. The left-hand side, in FIG. 2, of the container 5 is equipped with a narrow attached piece 7 which forms the top longitudinal edge of the container and extends in a straight line horizontally over its entire length.

The feed channel proper is a U-shaped groove 8 formed in a conduit 9. This is fixed directly below the edge 7. The groove 8 is normally covered by a receptacle 16, a component which will be described subsequently.

The end of the conduit 9 is visible on the left in FIG. 1. It is connected to the machine which is to be fed. At its right-hand end in FIG. 1 the conduit 9 is extended by a rigid tubular guide 10 which has at its right hand end a pedestal 11 mounted so as to pivot about a vertical axis. These elements form part of a drive mechanism designated by 12, which will be described in more detail later.

Bars to be machined 13 (FIG. 2) are heaped in bulk but in a parallel arrangement in the container 5. A gripping mechanism 14 is arranged so as to grip one bar 13 and one only, by its middle part, and to withdraw this middle part to a point above the edge 7 whilst an alignment mechanism 15 raises the bar gripped by the mechanism 14 progressively and gradually from the centre towards the two ends, after which the middle part of the bar is released and the whole of the bar falls onto the receptacle 16, which is then moved obliquely upwards, uncovering the channel 8, into which the bar 13 falls. The mechanism 12, like other auxiliary mechanisms which will be described later, can then act and ensure the engagement of the bar 13 in the lathe control members, its progressive advance as machining continues and finally the withdrawal of the non-machinable end of the bar towards the rear, its release and its ejection.

A description will now be given, with reference to FIGS. 2, 3 and 4, of the construction of the gripping mechanism 14. This mechanism is composed of a movable unit 17 having in its lateral faces guidance slides 18 mounted on rails fixed to an oblique transverse bridge 19 (FIG. 1) fixed to the framework 1 of the device, in the middle of its length. As can be seen in FIG. 2, a motor 21, fixed by screws to a strut 20 on the framework 1, drives a pinion 22 engaged in a rack 23 (FIGS. 3 and 4) in order to move the movable unit 17 to and fro on the bridge 19. FIG. 2 shows the idle position and, in dot and dash lines, a working position of this unit. In order to grip one and only one bar securely with each advance movement, the movable unit has various arrangements, the most important of which are the two end parts 24' and 24" of a jaw 24 (FIGS. 3 and 4) which pivots on a horizontal transverse axis 25, and a resilient blade 26 fixed along its top edge by two screws perpendicularly to the to and fro direction of the unit 17. The jaw 24 is provided with a heel at its rear end and this heel is articulated on a link 27 connected by an articulation with an eccentric to a pinion 28 meshing in a pinion 29 fixed to the output shaft of a motor 30. FIGS. 2 and 3 show clearly how the jaw 24 is controlled according to the advancement of the movable unit 17 so as to hook a bar in the stack present in the container 5 between its two end parts 24' and 24" and a lower tongue 70. The resilient blade 26 serves to check, by co-operating with a proximity detector 21, that one and only one bar has been gripped. A coil 32 mounted on a central shaft 33, a guided pin 34 and an adjustment screw 35 make it possible to adjust the members of the mechanism exactly according to the diameter of the bars 13. A control programme controlled by the detectors described ensures that, if the reciprocating movement of the movable unit 17 has not produced the gripping of a bar by its middle part, the movement is repeated as many times as necessary. Provision can also be made so that, after a certain number of movements which have remained ineffective, the machine stops and an alarm is triggered.

Returning to FIG. 2, the middle part of the bar which has been gripped can be seen at 13a. The alignment mechanism 15, which then comes into action, is depicted partially in FIG. 1, in section in FIG. 5 and in elevation and plan in FIGS. 6 and 7. It has a longitudinal profiled member 36 fixed by its two ends to the front faces of the framework 1, themselves supported by the profiled member 1. Two carriages 37 supported and guided by wheels 38 can travel along the profiled member 36. As can be seen in FIGS. 5 to 7, the carriages 37 are driven by an endless belt 39 which turns on pulleys 40 mounted at the two ends of the profiled member 36 and where the one which is situated at the left-hand end in FIGS. 6 and 7 is coupled to a motor 41. The profiled member 36 has notably two opposite longitudinal grooves in which on the one hand the two lengths of the belt 39 and on the other hand the wheels 38 pass. The frames of the carriages 37 have four fixed shafts carrying the wheels 38, a base and two side walls whose top ends connect the shafts of the wheels 38 and whose central parts have on the one hand a rib 42 against which the corresponding length of the belt 39 is fixed by a rivet. Thus, when the motor 41 rotates in one direction, the carriages move away from each other whilst they move closer together if the motor rotates in the other direction. FIG. 1 shows the carriages 37 in their close together position, on each side of the central support 19 of the gripping mechanism.

The bottom of each of the carriages 37 carries a vertical cylindrical rod 43 which extends downwards and on which there slides a concave cylindrical roller 44 whose side co-operates with a short ramp designated 45 in FIGS. 5, 6 and 7. The functioning of the alignment device can be seen clearly from these figures. Although FIG. 6 shows the carriages 37 in asymmetric positions, in order to show the extreme positions of the rollers 44 with respect to height, these two carriages are in fact always at the same distance from the middle part of the chassis. When the gripping mechanism 14 acts, they are situated in close-together positions and the rollers 44 are kept by the ramp 45 in the upper position, that is to say in the position in dot and dash lines in FIG. 5. The gripping mechanism is therefore left free to raise the central part of a bar and to bring it into the position 13a in FIG. 2 (also marked in FIG. 5). By moving towards the ends the carriages enable the rollers to slide over the descending parts of the ramp 45 so that the bottom edge of each roller hooks onto an intermediate part of the bar still resting on the pile of bars in the container 5 and raises it in order to bring it into the position 13b in FIG. 5. It will be understood that, when the movement of the carriages has ended and the jaws 24 have released the bar, the latter is then lying in a rectilinear position on the receptacle 16.

The receptacle 16 extends over the entire length of the device and covers the groove 8 which constitutes the feed channel. It is visible in FIGS. 1, 2, 5, 8 and 9. In fact it is subdivided into four segments each having a narrow plate 46 carrying on its bottom face two parallel racks 47 meshing in pinions 48, the eight pinions 48 being fixed to the same shaft 49 coupled to a single motor (not shown). This motor makes it possible to move the entire receptacle obliquely upwards in a regular translation movement so that the bar 13 resting on the elements 46 is retained by the stops which form the interposed partitions 50 (FIG. 1). It is then collected in the channel 8.

It remains to describe the auxiliary members which then act in order to connect the bar to the lathe members so as to ensure its machining.

FIG. 8 shows the auxiliary grip with automatic centring disposed as can be seen in FIG. 8 close to the right-hand end of the container and receptacle. At this point the conduit 9 is interrupted and a fixed unit 51 fixed to a cross member carries a motor 53 driving two pinions with the same diameter 54, each of which meshes in a toothed sector 55, 56 fixed to a clamp claw 57. The two toothed sectors 55 and 56 are coaxial, rotate in opposite directions and effect approximately a quarter of a turn at each driving. In FIG. 8 the scissors are depicted in solid lines in the closed position. They surround the rear end of the bar 13 and hold it in a position exactly centred with respect to the feed channel 8, whatever the diameter of this bar. In dot and dash lines, the open position of the clamp 57 can be seen.

When a bar 13 has reached the channel 8 as described previously, the clamp 57 closes a first time, which makes it possible to perform the last operation necessary to bring the bar into the machining position. New members which then act are depicted at the righthand end of FIG. 1. The drive mechanism 12 has in effect a bar-pushing member consisting of a flexible cable 58 notched in its length, which extends parallel to the container 5 in a tubular guide 59, makes in this guide an arc of a circle of 180 degrees and then passes over a pinion 60 actuated by a motor 61 (FIG. 1). The bar pusher 58 is visible notably in FIGS. 2, 5, 8 and 9. At the right-hand end of the device, it passes through the rigid guide 10 and ends, in its extreme remote condition, away from the auxiliary clamp 57. It carries at its end, in a manner known per se, a rotary ferrule provided with a bar clamp adapted to the size of the bar 13. As indicated at the start, the guide 10 is mounted so as to pivot about the axis of the pedestal 11 and, in its normal position, it is fixed by a screw coupling 62 to the rear end of the conduit 9. However, it can be moved laterally after unscrewing the coupling 62, which gives access to the bar clamp incorporated in the rotary ferrule. This is exchangeable and can therefore be adapted with precision to the diameter of the bars.

When a bar 13 has been introduced into the channel 8 as described above and the auxiliary clamp 17 has locked it, the motor 61 is started up so as to move the bar pushing cable towards the left in the guide 10 and engage the clamp on the bar. Next the clamp 57 is opened and the motor 61 can progressively conduct the bar towards the left as machining takes place.

When the machining of a bar has ended, the motor 61 is controlled in reverse. The remaining bar end is returned to the right-hand end of the channel 9 or conduit and the clamp 57 once again closes on it. FIGS. 8 and 9 and their cross sectional locations denoted in FIG. 1 show that an end segment of conduit 9 with a length of approximately 40 cm is shaped differently from what is shown in FIGS. 2 and 5. Instead of the channel 8 being formed in a fixed bar with a rectangular profile, like the conduit 9, it is formed in a profiled rod segment 63 which pivots about a longitudinal axis 64 fixed to a toothed section 65 which meshes a pinion 66 driven by a motor (not shown). An injection plate 67 is disposed under the pivoting profiled member 63. After the clamp 57 has closed again on the bar end, the bar pusher 58 has moved towards the right in order to extract the bar clamp, its movement being controlled by three successive detectors 68, and the clamp 57 has opened once again, the pivoting profiled member 63 tilts and the bar end is discharged by gravity through an opening in the profiled member 1. It falls into a container.

A value of around 40 cm has been indicated for the length of the profiled member 63, which corresponds in practice to the maximum length which the bar ends can have, but it is obvious that in general these non-machinable bar remainders are shorter. In this case the functioning of the components described is exactly the same.

Likewise, the gripping mechanism, arranged so as to grip the bar in its middle part in the device described above, can also be disposed so as to grip the bar at one or other of its ends, or at any other point along the bar, the bar alignment device 15 being able to be replaced by any suitable component, for example a hooking finger, which is moved in the longitudinal direction. In a variant, two gripping devices can be provided, for example so as to grip the bar at each of its ends.

What is claimed is:

1. A device for supplying a machine tool, in particular an automatic lathe, with bars to be machined, comprising a feed channel aligned on the axis of the machine tool and means for introducing bars into this channel one by one, wherein the said means comprise a fixed container able to contain a stock of bars stacked in bulk in the longitudinal direction, having a straight top longitudinal edge, a receptacle adjacent to the said top edge of the container and extending above the feed channel, said receptacle being displaceable to uncover the feed channel, at least one repetitive-action gripping mechanism, disposed so as to grip, in the container, at least a portion of a bar to be introduced into the channel and to pull it into a given position situated above the receptacle, at least one alignment mechanism having at least one member which moves in the longitudinal direction and progressively withdraws from the container all the bar gripped by the gripping mechanism, so as to place all the bar in the receptacle, and control means which cause the said bar to be released by the gripping mechanism, to drop into the bottom of the receptacle and then into the feed channel.

2. A device according to claim 1, wherein the control means are arranged so as to cause a movement of the receptacle which causes the bar received in the receptacle to drop from the latter into the feed channel.

3. A device according to claim 2, and further having means of fixing and axial movement, with monitored control, in order to connect each bar introduced into the feed channel to the lathe control members, and then remove and eject, out of the channel, the bar end remaining after machining.

4. A device according to claim 3, wherein the said means for ejecting the bar ends at the end of machining consist of the fact that a rear portion of the feed channel, with a length greater than the maximum possible bar end, is arranged so as to be able to tilt about an axis parallel to the axis of the channel.

5. A device according to claim 4, wherein the feed channel is equipped with an auxiliary clamp with programmed control, capable of fixing, in a position exactly centred with respect to the channel, a bar part situated in the channel, this auxiliary clamp serving to fix the rear of a full bar at the time of engagement of the bar clamp and to fix the rear of a bar end at the end of machining in order to make it possible to remove the bar clamp therefrom before ejection.

6. A device according claim 3, wherein the alignment mechanism includes a pair of carriages guided and supported by a profiled rail disposed above the container, each carrying a vertical rod on which a profiled roller slides, these rollers being moved vertically on the said rods by a fixed ramp according to the mutual separation of the carriages during their movement so as to effect the alignment of the bar.

7. A device according to claim 3, wherein the said fixing and axial movement means include a bar clamp mounted on a rotary ferrule at one end of a cable driven in the direction of its axis so as to advance and then withdraw in the feed channel, the advance and withdrawal of this cable being co-ordinated with the control of the lathe.

8. A device according to claim 7, wherein the bar clamp mounted on the rotary ferrule is exchangeable in order to enable it to be adapted to the diameter of the bars to be loaded.

9. A device according to claim 8, wherein the feed channel is equipped with an auxiliary clamp with programmed control, capable of fixing, in a position exactly centred with respect to the channel, a bar part situated in the channel, this auxiliary clamp serving to fix the rear of a full bar at the time of engagement of the bar clamp and to fix the rear of a bar end at the end of machining in order to make it possible to remove the bar clamp therefrom before ejection.

10. A device according to claim 2, wherein said receptacle consists of a series of elongate plates supported and guided in line with each other, fixed to racks in which there mesh pinions fixed to the same shaft controlled by a motor, the latter driving a lateral movement of all said plates while stop means retain the bar supported in the bottom of the receptacle, said bar thus dropping in the feed channel in order to cause the bar to drop.

11. A device according to claim 1, and further having means of fixing and axial movement, with monitored control, in order to connect each bar introduced into the feed channel to the lathe control members, and then remove and eject, out of the channel, the bar end remaining after machining.

12. A device according claim 11, wherein the alignment mechanism includes a pair of carriages guided and supported by a profiled rail disposed above the container, each carrying a vertical rod on which a profiled roller slides, these rollers being moved vertically on the said rods by a fixed ramp according to the mutual separation of the carriages during their movement so as to effect the alignment of the bar.

13. A device according to claim 1, wherein the said top longitudinal edge of the container is the horizontal top edge of a flat plate placed obliquely and forming a lateral wall of the container.

14. A device according to claim 1, wherein the gripping mechanism includes a rigid frame, able to move perpendicularly to the container in the middle thereof, and controlled so as to effect at least one to and fro movement with respect to the container each time a bar is gripped.

15. A device according to claim 14, wherein the gripping mechanism includes, mounted in its frame, two parallel end parts of a jaw, a resilient support blade placed between the said end parts of the jaw, and drive means for giving the jaw a hooking on movement co-ordinated with the advance movement of the frame.

16. A device according to claim 15, wherein the control means are associated with the gripping mechanism and provided with detectors so as to cause a repetition of the gripping movement and alignment movement if, during a first gripping movement, no bar has been hooked between the jaws and the said resilient blade.

17. A device according claim 16, wherein the alignment mechanism includes a pair of carriages guided and supported-by a profiled rail disposed above the container, each carrying a vertical rod on which a profiled roller slides, these rollers being moved vertically on the said rods by a fixed ramp according to the mutual separation of the carriages during their movement so as to effect the alignment of the bar.

18. A device according claim 1, wherein the alignment mechanism includes a pair of carriages guided and supported by a profiled rail disposed above the container, each carrying a vertical rod on which a profiled roller slides, these rollers being moved vertically on the said rods by a fixed ramp according to the mutual separation of the carriages during their movement so as to effect the alignment of the bar.

* * * * *

UNITED STATES PATENT AND TRADEMARK OFFICE
CERTIFICATE OF CORRECTION

PATENT NO.     : 6,554,559 B1
DATED          : April 29, 2003
INVENTOR(S)    : Per Borg and Francisco Rivera It is certified that error appears in the above-identified patent and that said Letters Patent is hereby corrected as shown below:

<u>Column 3,</u>
Line 5, please delete "proximity detector 21" and insert in lieu thereof -- proximity detector 31 --.

<u>Column 4,</u>
Line 32, please delete "righthand" and insert in lieu thereof -- right-hand --.
Line 60, please delete "channel 9 or conduit" and insert in lieu thereof -- channel or conduit 9 --.

<u>Column 7,</u>
Line 9, please delete "according claim 16" and insert in lieu thereof -- according to claim 16 --.
Line 11, please delete "supported-by" and insert in lieu thereof -- supported by --.

Signed and Sealed this

Twenty-first Day of October, 2003

JAMES E. ROGAN
*Director of the United States Patent and Trademark Office*